(12) United States Patent
Wu

(10) Patent No.: US 8,391,569 B2
(45) Date of Patent: Mar. 5, 2013

(54) FINGERPRINT IDENTIFYING SYSTEM

(75) Inventor: Jen-Chieh Wu, Pingtung County (TW)

(73) Assignee: Gingy Technology Inc., Hsinchu (TW)

( * ) Notice: Subject to any disclaimer, the term of this patent is extended or adjusted under 35 U.S.C. 154(b) by 864 days.

(21) Appl. No.: 12/462,562

(22) Filed: Aug. 5, 2009

(65) Prior Publication Data
US 2010/0208952 A1 Aug. 19, 2010

(30) Foreign Application Priority Data
Feb. 19, 2009 (TW) .............................. 98105279 A

(51) Int. Cl.
*G06K 9/00* (2006.01)
(52) U.S. Cl. ...................... 382/124; 359/201.2; 382/126
(58) Field of Classification Search .................. 382/124, 382/126; 359/201.2
See application file for complete search history.

(56) References Cited

U.S. PATENT DOCUMENTS

| 5,448,649 A * | 9/1995 | Chen et al. ..................... 382/126 |
| 7,167,619 B2 * | 1/2007 | Veligdan et al. ............... 385/120 |
| 2005/0004956 A1 * | 1/2005 | Pourdeyhimi ................ 708/191 |
| 2008/0267463 A1 * | 10/2008 | Yuan ............................. 382/124 |

\* cited by examiner

*Primary Examiner* — Gregory M Desire
(74) *Attorney, Agent, or Firm* — Morris Manning & Martin LLP; Tim Tingkang Xia, Esq.

(57) ABSTRACT

A fingerprint identifying system includes a light-transmissive finger press plate, a light source, a beam-splitter, and an image-capturing unit. The light-transmissive finger press plate has a top face adapted to contact a finger. The light source emits a light beam adapted to interact with the finger on the top face. The beam-splitter is disposed below the finger press plate and splits the light beam into a transmission light beam and a reflection light beam. The image-capturing unit receives at least one of the transmission light beam and the reflection light beam from the beam-splitter.

13 Claims, 6 Drawing Sheets

US 8,391,569 B2

FINGERPRINT IDENTIFYING SYSTEM

CROSS-REFERENCE TO RELATED APPLICATION

This application claims priority of Taiwanese Application No. 098105279, filed on Feb. 19, 2009.

BACKGROUND OF THE INVENTION

1. Field of the Invention

The invention relates to a fingerprint identifying system, more particularly to a fingerprint identifying system having an improved identification rate.

2. Description of the Related Art

Referring to FIG. 1, a conventional fingerprint identifying system 1 includes an image-capturing unit 11, a finger press plate 12, a light-diffusion plate 13 disposed between the image-capturing unit 11 and the finger press plate 12, and a plurality of light sources 14 disposed below the light-diffusion plate 13. The finger press plate 12 has a press surface 121 for disposing a finger (A) thereon. The light-diffusion plate 13 guides the light from the light sources 14 so as to serve as a planar light source transmitting light toward the finger press plate 12, and has a through hole 131 in alignment with the image-capturing unit 11. When the light from the light-diffusion plate 13 illuminates the finger (A) disposed on the press surface 121 of the finger press plate 12, the light illuminating the grooves of the finger (A) is reflected from the press surface 121 to the image-capturing unit 11 through total internal reflection, and the light illuminating the ridges of the finger (A) will be absorbed by the finger (A) so as to create a fingerprint image, which is dark where there are ridges and bright where there are grooves.

However, since there is the through hole 131 in the light-diffusion plate 13, the light illuminating the center portion of the finger (A) is less than that illuminating the remainder of the finger (A). Therefore, the center portion of the finger (A) has an unsatisfactory illumination, which results in an unsatisfactory fingerprint identification rate.

Referring to FIG. 2, another conventional fingerprint identifying system 2 includes an image-capturing device 21, a finger press plate 22 disposed above the image-capturing device 21 for disposing a finger (B) thereon, and two light sources (i.e., light-emitting diodes) 23 disposed at two sides of the image-capturing device 21, respectively. Since the light-emitting diodes have characteristics of high brightness, the center portion of the finger has an improved illumination.

However, since the light-emitting diodes have a relatively small light source angle, the illumination on the finger press plate 22 is uneven. Therefore, the identification rate improved by the fingerprint identifying system 2 is limited.

SUMMARY OF THE INVENTION

Therefore, an object of the present invention is to provide a fingerprint identifying system which has an improved identification rate.

Accordingly, the fingerprint identifying system of this invention includes a light-transmissive finger press plate, a light source, a beam-splitter, and an image-capturing unit. The light-transmissive finger press plate has a top face adapted to contact a finger. The light source emits a light beam adapted to interact with the finger on the top face. The beam-splitter is disposed below the finger press plate and splits the light beam into a transmission light beam and a reflection light beam. The image-capturing unit receives at least one of the transmission light beam and the reflection light beam from the beam-splitter.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
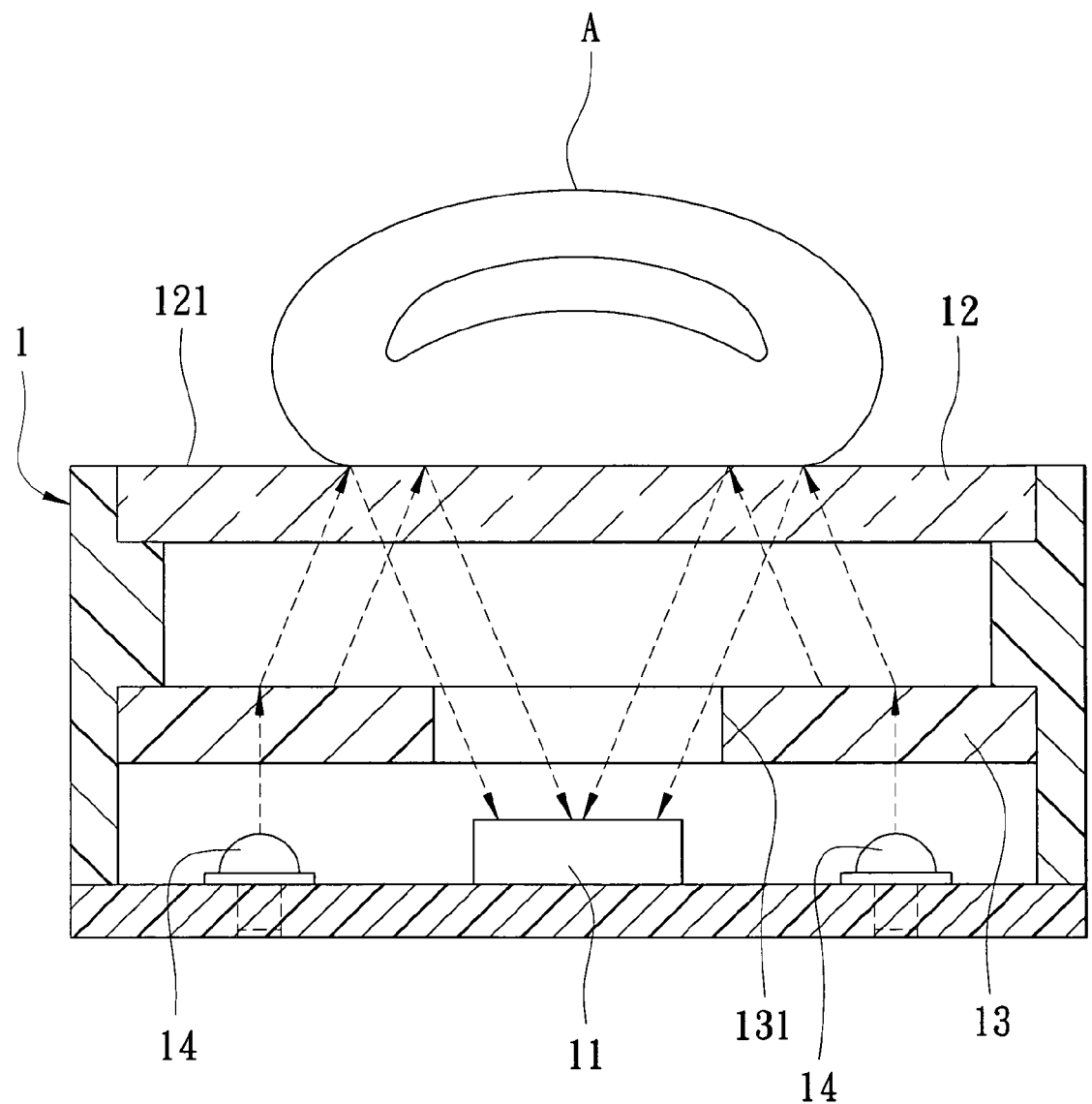
FIG. 1 is a sectional view of a conventional fingerprint identifying system.
Figure 2:
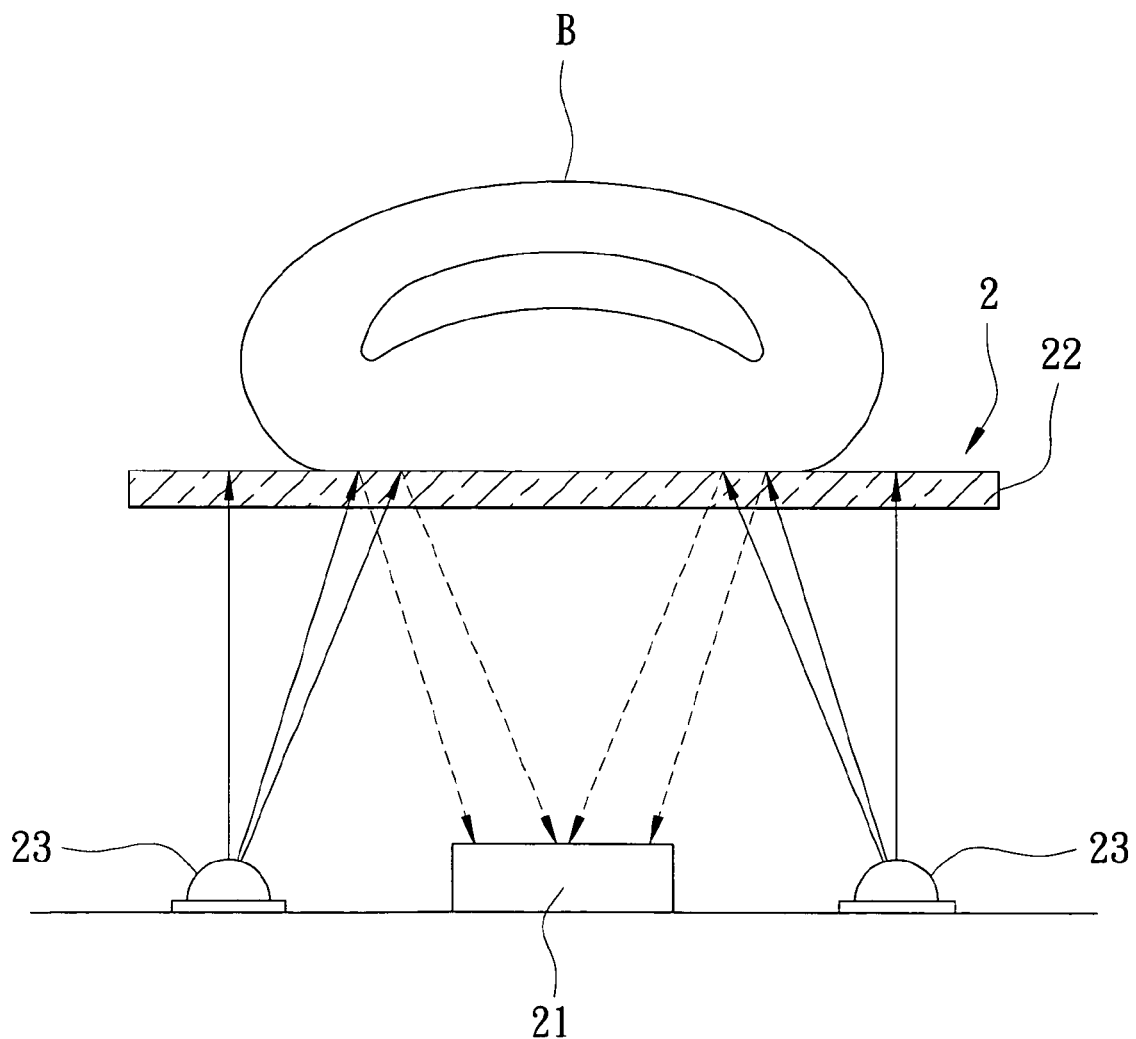
FIG. 2 is a schematic view of another conventional fingerprint identifying system.
Figure 3:
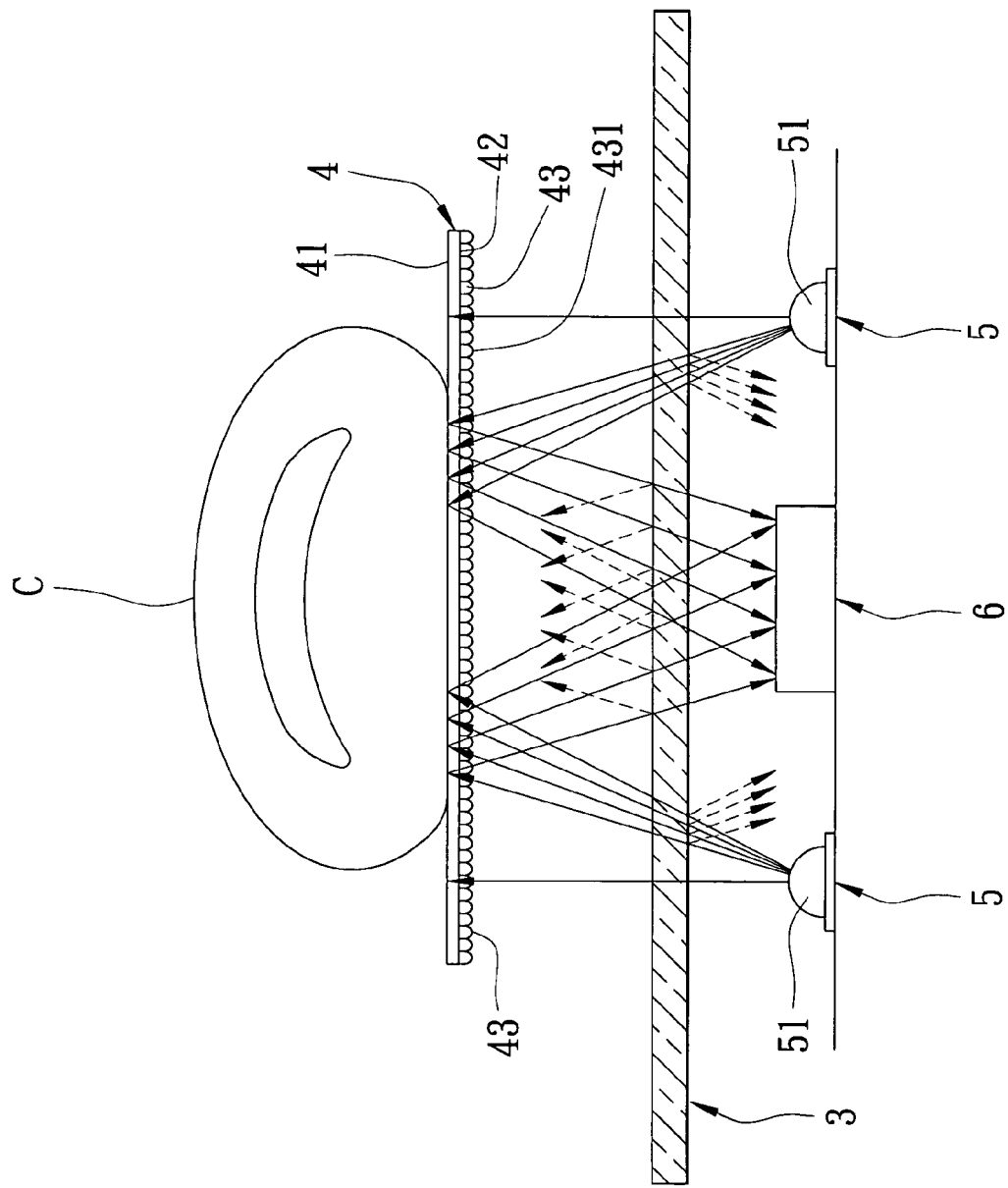
FIG. 3 is a schematic view of a first preferred embodiment of a fingerprint identifying system according to this invention.

Referring to FIG. 3, the first preferred embodiment of a fingerprint identifying system according to this invention includes a light-transmissive finger press plate 4, a light source 5, a beam-splitter 3, and an image-capturing unit 6.

The light-transmissive finger press plate 4 is made of glass in this preferred embodiment, and has a top face 41 adapted to contact a finger (C), a bottom face 42 opposite to the top face 41, and a microstructure layer 43 provided on the bottom face 42 of the light-transmissive finger press plate 4. Alternatively, the microstructure layer 43 can be provided on the top face 41 of the light-transmissive finger press plate 4. The microstructure layer 43 includes a plurality of microstructures 431. The microstructures 431 include indentations and protrusions, which are of V-shaped cross-section, trapezoid cross-section, semi-circular cross-section, etc. In this preferred embodiment, the microstructures 431 are of semi-circular cross-section. The microstructure layer 43 used in this preferred embodiment is a MN TECH Micro lens diffuser.

The light source 5 emits a light beam adapted to interact with the finger (C) on the top face 41 of the light-transmissive finger press plate 4. The light source 5 includes two light units 51 disposed on two sides of the image-capturing unit 6. The light units 51 used in this preferred embodiment are light-emitting diodes.

The beam-splitter 3 is disposed below the finger press plate 4 and splits the light beam into a transmission light beam and a reflection light beam. Preferably, the beam-splitter 3 has a transmittance ranging from 10% to 90% and a reflectance ranging from 90% to 10%. The beam-splitter 3 used in this preferred embodiment has a transmittance of about 80% and a reflectance of about 20%.

The image-capturing unit 6 receives the transmission light beam from the beam-splitter 3. The image-capturing unit 6 and the light source 5 are disposed below the beam-splitter 3. The light beam of the light source 5 is directed to the finger press plate 4 through the beam-splitter 3 and is then re-directed back to the beam-splitter 3. The transmission light beam received by the image-capturing unit 6 is a secondary transmission light beam from the beam-splitter 3.

Since the beam-splitter 3 used in this preferred embodiment has a transmittance of about 80% and a reflectance of about 20%, the brightness of the light-emitting diodes used as the light source units 51 can be moderated by the beam-splitter 3. Furthermore, since the microstructure layer 43 includes a plurality of microstructures 431, the light from the beam-splitter 3 can be refracted via the microstructures 431 of the microstructure layer 43 so as to homogeneously scatter the light out of the microstructure layer 43 to the top face 41 of the finger press plate 4. Therefore, the whole area of the top surface 41 of the finger press plate 4 has a satisfactory illumination for identifying the fingerprint.

It should be noted that the configuration and the density of the microstructures 431 of the microstructure layer 43 can be specified according to the practical requirement so as to obtain an optimal illumination for identifying the fingerprint.

Figure 4:
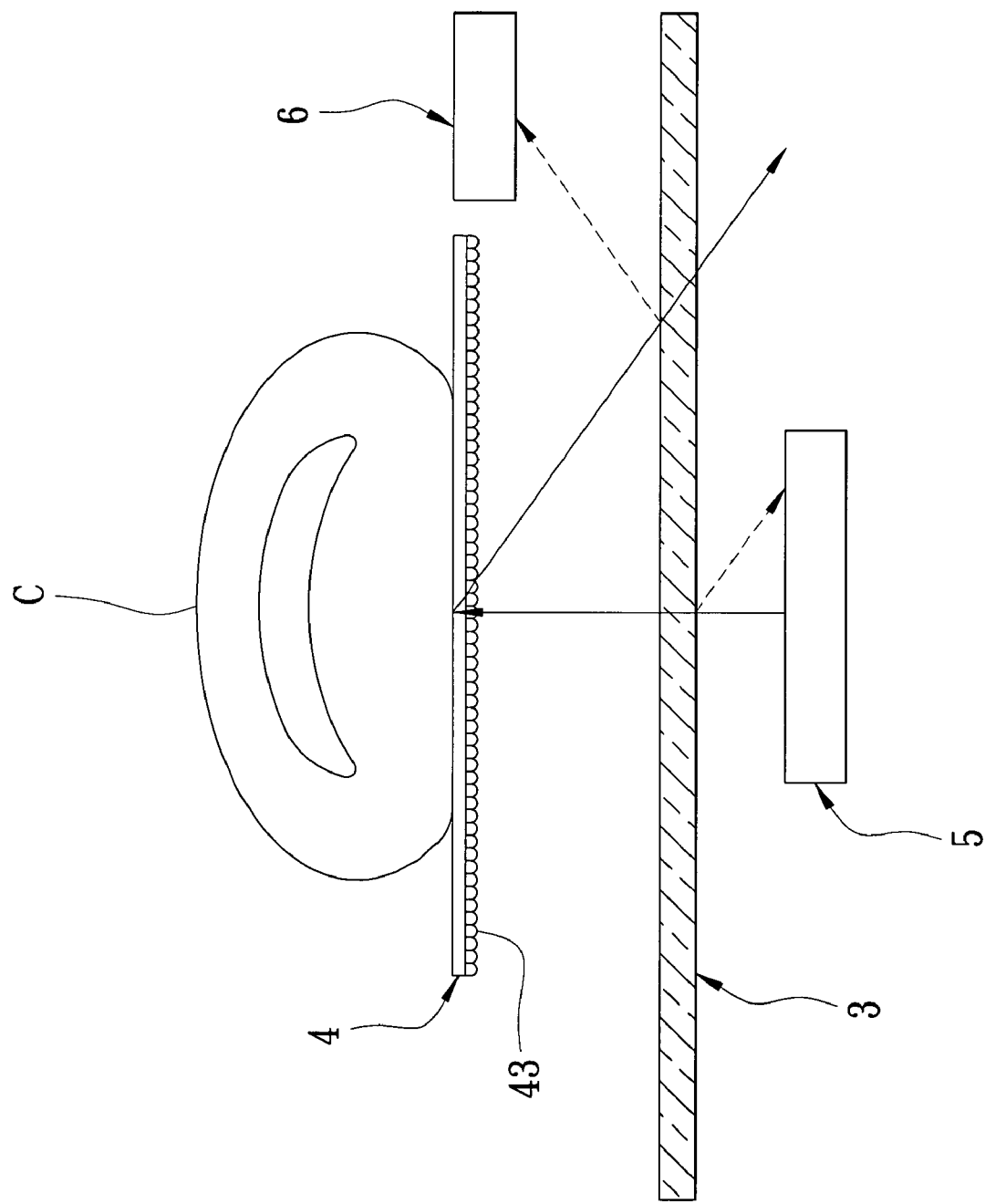
FIG. 4 is a schematic view of a second preferred embodiment of a fingerprint identifying system according to this invention.

Referring to FIG. 4, the second preferred embodiment of a fingerprint identifying system according to this invention is similar to the first preferred embodiment except for the following:

The image-capturing unit 6 is disposed above the beam-splitter 3. The beam-splitter 3 sends the reflection light beam to the image-capturing unit 6. The beam-splitter 3 used in this preferred embodiment has a transmittance of about 50% and a reflectance of about 50%. The light source 5 is disposed below the beam-splitter 3 and is a planar light source. The light beam of the light source 5 is sent to the finger press plate 4 through the beam-splitter 3 and is re-directed back to the beam-splitter 3. The reflection light beam received by the image-capturing unit 6 is a secondary reflection light beam from the beam-splitter 3.

Figure 5:
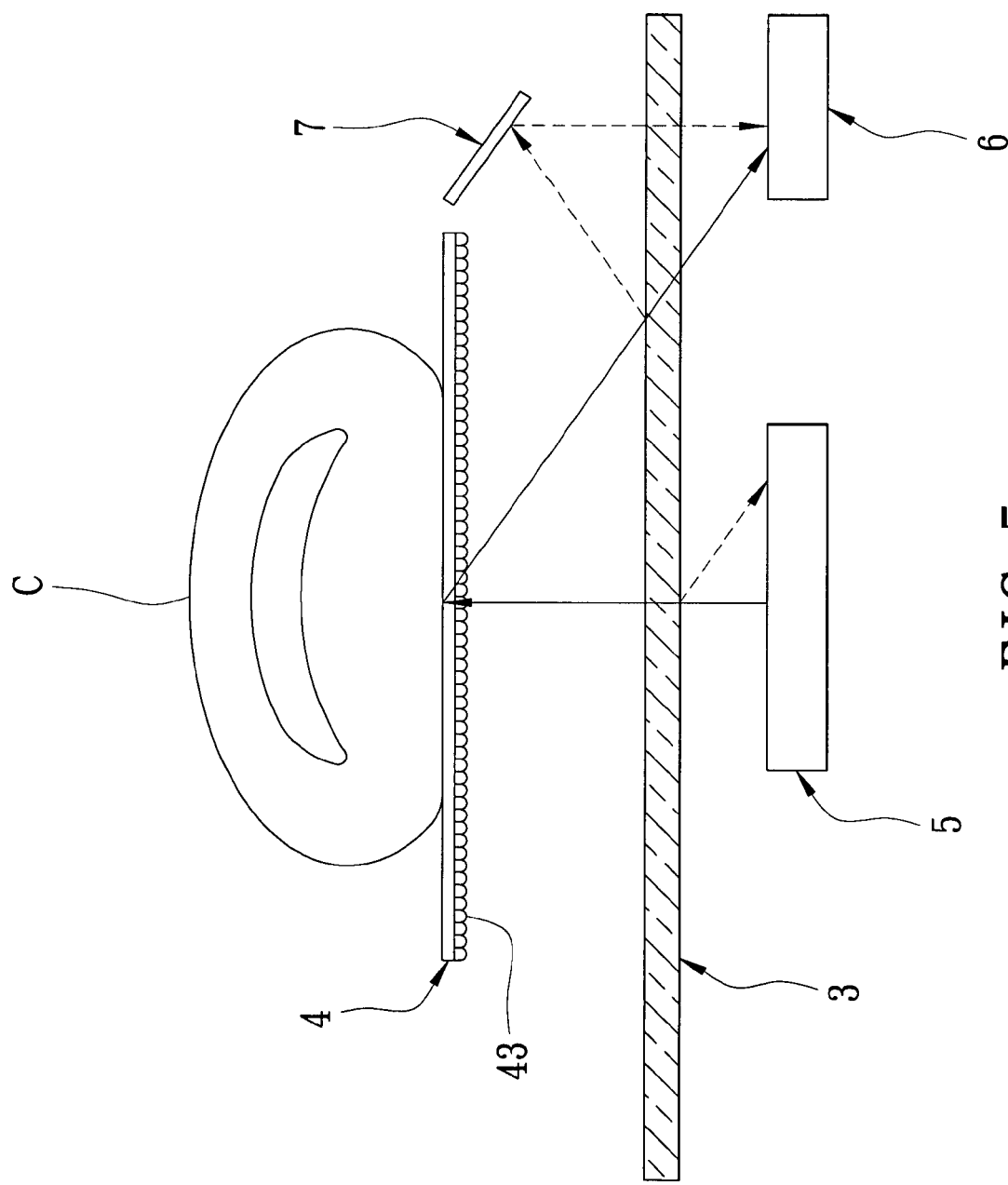
FIG. 5 is a schematic view of a third preferred embodiment of a fingerprint identifying system according to this invention.

Referring to FIG. 5, the third preferred embodiment of a fingerprint identifying system according to this invention is similar to the second preferred embodiment except for the following:

A reflecting member 7 is included in the third preferred embodiment. The reflecting member 7 is disposed above the beam splitter 3. The image-capturing unit 6 and the light source 5 are disposed below the beam-splitter 3, and the image-capturing unit 6 is disposed on one side of the light source 5. The reflecting member 7 and the image-capturing unit 6 are substantially aligned in a vertical direction. The beam-splitter 3 used in this preferred embodiment has a transmittance of about 70% and a reflectance of about 30%. The beam-splitter 3 sends a second reflection light beam to the reflecting unit 7. The reflection light beam received by the image-capturing unit 6 is a tertiary reflection light beam from the reflecting member 7.

Figure 6:
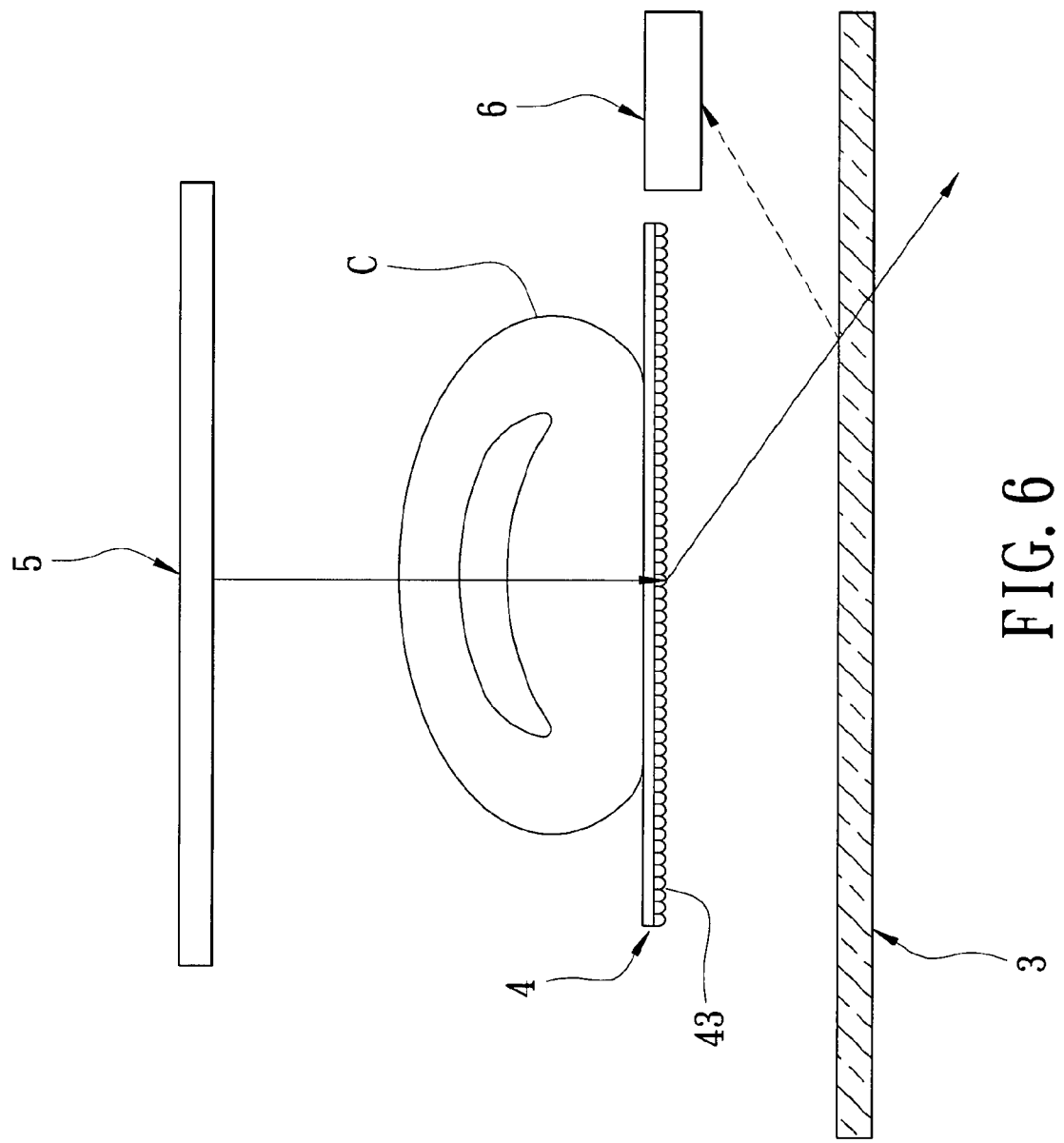
FIG. 6 is a schematic view of a fourth preferred embodiment of a fingerprint identifying system according to this invention.

Referring to FIG. 6, the fourth preferred embodiment of a fingerprint identifying system according to this invention is similar to the second preferred embodiment except that the light source 5 is disposed above the finger press plate 4. The light beam of the light source 5 is an invisible light beam which is sent downwardly to the finger press plate 4 and then to the beam-splitter 3. The reflection light beam received by the image-capturing unit 6 is a primary reflection light beam from the beam-splitter 3. Preferably, the invisible light beam of the light source 5 is a near infrared light beam having a wavelength ranging from 680 to 940 nm.

It should be noted that the beam-splitter 3 can be replaced with a reflecting mirror so that the light beam sent to the reflecting mirror is totally reflected to the image-capturing unit 6.

In view of the above description, the fingerprint identifying system of the present invention has the following advantages:

1. Since the beam-splitter 3 is used in the fingerprint identifying system of the present invention, the brightness of the light source 5 can be moderated, especially when a light-emitting diode is used as the light source 5, and the arrangement of the image-capturing unit 6 is relatively flexible.

2. The use of the microstructure layer 43 can homogeneously scatter light to the top face 41 of the finger press plate 4 such that the fingerprint identification rate can be enhanced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A fingerprint identifying system comprising:
    a light-transmissive finger press plate having a top face adapted to contact a finger;
    a light source emitting a light beam adapted to interact with the finger on the top face of the light-transmissive finger press plate;
    a beam-splitter disposed below the finger press plate and splitting the light beam reflected or refracted by the light-transmissive finger press plate into a transmission light beam and a reflection light beam; and
    an image-capturing unit receiving the reflection light beam from the beam-splitter, wherein the image-capturing unit is disposed above the beam-splitter, and the beam-splitter transmits the reflection light beam to the image-capturing unit.

2. The fingerprint identifying system as claimed in claim 1, wherein the light source is disposed below the beam-splitter, and the light beam of the light source is sent to the finger press plate through the beam-splitter and re-directed back to the beam-splitter.

3. The fingerprint identifying system as claimed in claim 1, wherein the light source is disposed above the finger press plate, the light beam of the light source is an invisible light beam which is sent downwardly to the finger press plate and then to the beam-splitter, and the reflection light beam received by the image-capturing unit is a primary reflection light beam from the beam-splitter.

4. The fingerprint identifying system as claimed in claim 1, wherein the finger press plate includes a microstructure layer.

5. The fingerprint identifying system as claimed in claim 4, wherein the microstructure layer is provided on a bottom face of the light-transmissive finger press plate.

6. The fingerprint identifying system as claimed in claim 4, wherein the microstructure layer includes a plurality of microstructures.

7. The fingerprint identifying system as claimed in claim 6, wherein the microstructures include indentations and protrusions.

8. The fingerprint identifying system as claimed in claim 7, wherein the indentations and protrusions are of V-shaped cross-section, trapezoid cross-section, or semi-circular cross-section.

9. The fingerprint identifying system as claimed in claim 1, wherein the beam-splitter has a transmittance ranging from 10% to 90% and a reflectance ranging from 90% to 10%.

10. The fingerprint identifying system as claimed in claim 1, wherein the beam-splitter is vertical to an optical axis of the light source.

11. A fingerprint identifying system comprising:
    a light-transmissive finger press plate having a top face adapted to contact a finger;

a light source emitting a light beam adapted to interact with the finger on the top face;

a beam-splitter disposed below the finger press plate and splitting the light beam from the light source into a transmission light beam and a first reflection light beam;

an image-capturing unit receiving at least one of the transmission light beam and the first reflection light beam from the beam-splitter; and a reflecting member disposed above the beam-splitter, the image-capturing unit and the light source being disposed below the beam-splitter, the image-capturing unit being disposed on one side of the light source, the reflecting member and the image-capturing unit being substantially aligned in a vertical direction, the beam-splitter sending a second reflection light beam to the reflecting member, and the second reflection light beam received by the image-capturing unit being a tertiary reflection light beam from the reflecting member.

12. A fingerprint identifying system comprising:

a light-transmissive finger press plate having a top face adapted to contact a finger;

a light source emitting a light beam adapted to interact with the finger on the top face;

a beam-splitter disposed below the finger press plate and splitting the light beam from the light source into a transmission light beam and a reflection light beam; and an image-capturing unit receiving the reflection light beam from the beam-splitter;

wherein the image-capturing unit and the light source are disposed below the beam-splitter, the transmission light beam is reflected by the light-transmissive finger press plate, the transmission light beam reflected by the light-transmissive finger press plate is further transmitted through the beam splitter before being received by the image- capturing unit.

13. The fingerprint identifying system as claimed in claim 12, wherein the light source includes two light units disposed on two sides of the image-capturing unit.

\* \* \* \* \*